Aug. 21, 1934.  F. W. HARRIS  1,971,139
AUTOMATIC INDIRECT HEATED STORAGE WATER HEATER
Filed Nov. 8, 1933  2 Sheets-Sheet 2
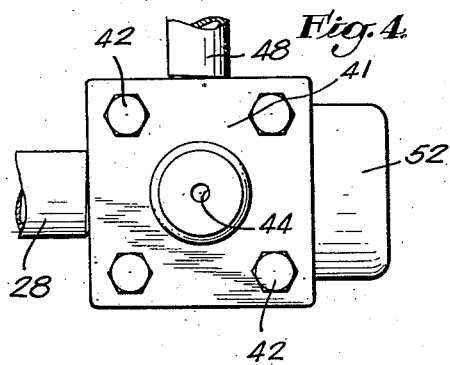
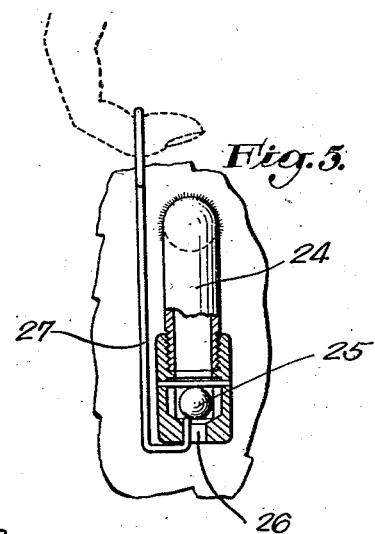
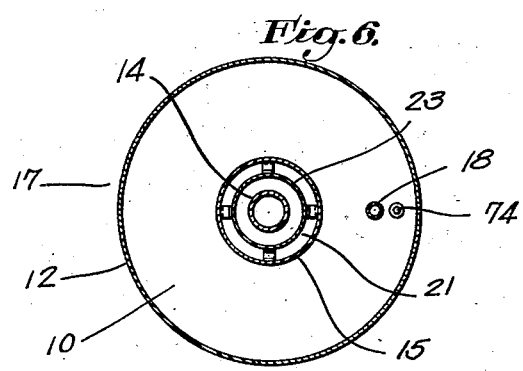
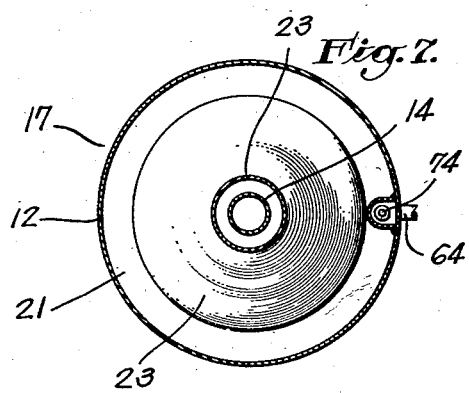
INVENTOR:

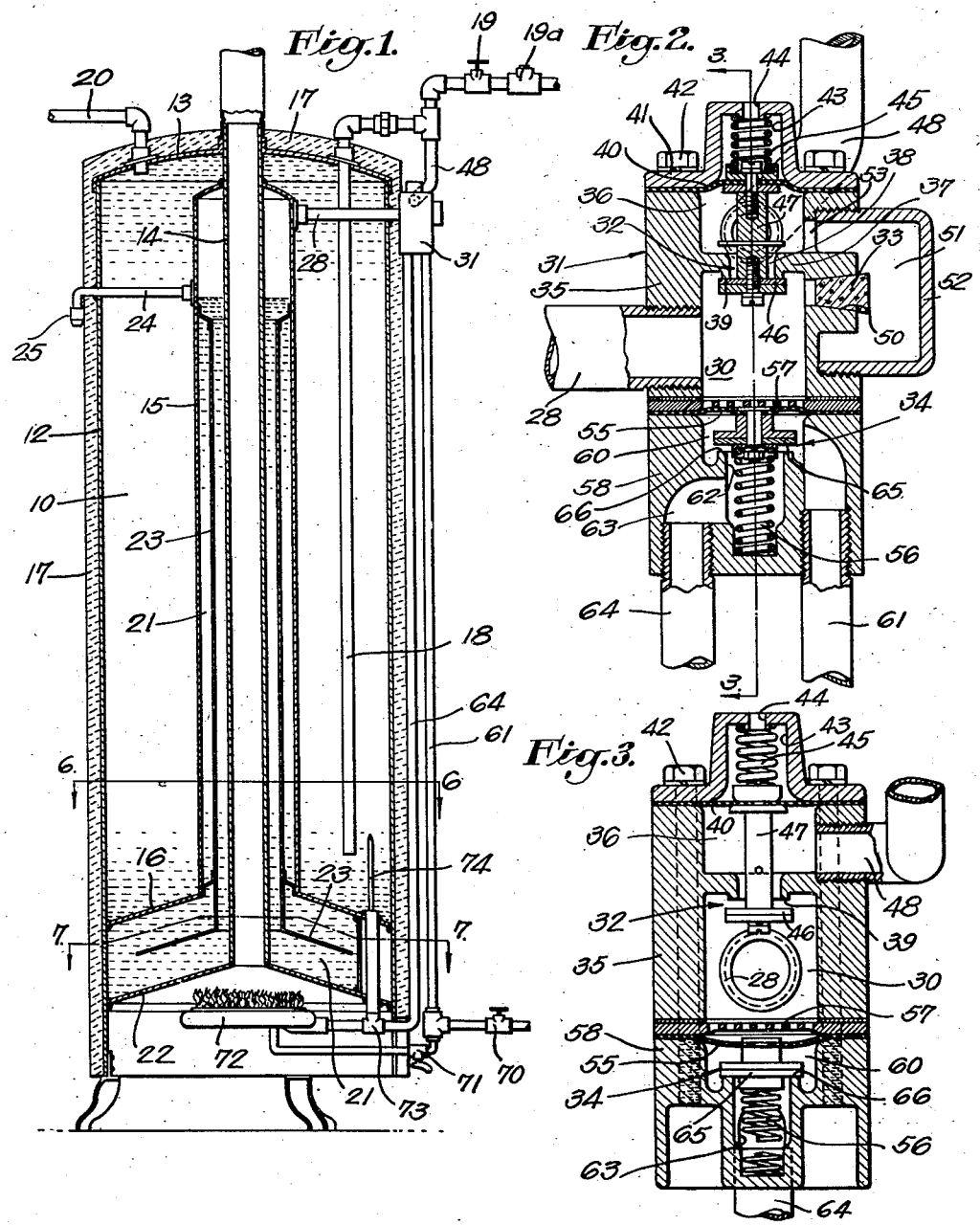

UNITED STATES PATENT OFFICE

1,971,139

AUTOMATIC INDIRECT HEATED STORAGE WATER HEATER

Ford W. Harris, Los Angeles, Calif., assignor to Patco, Inc., Los Angeles, Calif., a corporation of California Application November 8, 1933, Serial No. 697,164

12 Claims. (Cl. 122—504)

My invention relates to water heaters and is particularly adapted to devices used to heat water for domestic purposes by the use of a burner using gas, kerosene, or other liquid or gaseous fuel. In the embodiment of the invention later described herein for the purpose of showing one method by which the invention may be practiced, a burner is described using gas which may be obtained from any suitable source. The invention is also particularly adapted to storage type heaters in which a considerable volume of hot water is stored, this water being drawn upon whenever needed, there being heat applied thereto as the water is removed from the heater and replaced with cold water from the source of supply, the application of heat being continued until the water in the heater is raised to a predetermined maximum temperature which is usually below the atmospheric boiling point of water; that is, 212° F. (100° C.). Heaters of the general type described above are old in the art, being in general use throughout the United States.

My invention further relates to a heater of the indirect heating type; that is to say, a heater in which the service water, or water which it is the function of the heater to heat and which is used by the consumer, is not heated by direct contact with metal plates which confine the service water and which are exposed on one side to the products of combustion of the burner, which is the general practice in storage heaters, but is heated by a body of inert water which is interposed between the service water and these directly heated surfaces, the inert water acting as a heat transfer medium receiving heat from the metal plates heated directly by the products of combustion from the burner and transmitting this heat to the service water through metal plates which serve to separate the inert and the service water. Indirect heaters broadly considered are old in the art. The principal advantage of indirect heaters is that if the inert water is separated entirely from the service water and remains in the heater indefinitely, any impurities initially in this water which might have a corrosive action on the directly heated surfaces, or which might cause deposits or "scale" on these surfaces, are soon exhausted, so that further corrosion or scale is impossible.

In the ordinary storage water heater of the direct type, especially where water containing large amounts of calcium salts must be heated, the deposition of these salts on the directly heated surfaces is very great, due to the fact that ebullition or the formation of steam takes place in the water in contact with these surfaces and a typical "boiler scale" is formed which greatly reduces the heat transfer from the metal of the directly heated surfaces to the water and greatly reduces the efficiency and heating capacity of the heater.

In heaters of the indirect type very little deposition takes place from the service water on the indirectly heated surfaces of the metal plates separating the service water and the inert water since these plates are never raised to a sufficiently high temperature to produce ebullition in the service water.

The principal difficulty met with in producing an indirect heater of the storage type is due to the fact that such heaters must be moderate in cost and to the further fact that they must not be subjected to pressures that would disrupt the thin walls necessarily used in their construction. In the direct heated storage heater there is no danger of explosions due to high pressure in the service water space since this space is always open to the source of water supply and can not exceed the pressure therein for the reason that any steam formed in the heater may blow back into the pipes which supply water to the heater. In indirect heaters of the storage type, as previously constructed, it has been the practice to also connect the inert water space with the source of water supply so that if a pressure is developed in this inert water space in excess of the pressure of the source of water supply, this pressure can be relieved through the pipe or vent connecting the inert water space with the source of supply. Such an arrangement prevents excessive pressures building up in the inert water space and thus prevents explosions. Any expansion of the water in the inert water space forces a little inert water out of this space into the source of water supply through the pipe or vent and any subsequent contraction draws a little service water into the inert water space. Since the burner operates intermittently due to variations in demand for hot water, such expansions and contractions are frequent, so that there are many exchanges of inert and service water, with the result that small quantities of inert water from which the scale forming impurities have been deposited are intermittently being replaced at frequent intervals with service water containing such impurities, which deposit on the directly heated surfaces. The inert water therefore never becomes fully inert, but always contains scale forming material, and a constant deposition of this material takes place on the directly heated surfaces. The rate of deposition of this material is, however, slower in an indirect heater of the vented inert water space type described above, than in a water heater of the directly heated type, and experience shows that such vented indirect heaters are superior to direct heaters.

It is an object of my invention to provide a water heater of the indirect storage type in which the inert water space is not in direct communication with the source of supply or the service water space in the normal operation of the heater, and in which the inert water is not frequently contaminated by infusions of service water.

It is a further object of my invention to provide means for preventing the pressure in the inert water space from rising above the service water pressure during the normal operation of the heater, and to provide means for relieving this pressure should it accidentally rise above service water pressure.

It is a further object of the invention to provide means for preventing further operation of the heater, should such an accidental rise in pressure occur, until the heater has been inspected so that the conditions which caused this rise can be remedied.

It is a further object of the invention to provide means for shutting off the gas supply to the heater should any failure or discontinuance of the water supply occur.

Further objects and advantages will be made evident hereinafter.

Referring to the drawings, which are for illustrative purposes,

Fig. 1 is a vertical cross-section through one form of an automatic indirect heated storage water heater embodying one form of my invention.

Fig. 2 is a section on an enlarged scale of a controller, this section being taken on the same plane as that of Fig. 1.

Fig. 3 is a section through the controller on a plane indicated by the line 3—3 of Fig. 2.

Fig. 4 is a view of the top of the controller.

Fig. 5 is a view partly in section showing the method used in venting the inert water space.

Fig. 6 is a section on a plane represented by the line 6—6 of Fig. 1.

Fig. 7 is a section on a plane represented by the line 7—7 of Fig. 1.

In the form of my invention shown in the drawings the service water space 10 is entirely enclosed by a shell which includes an outer wall 12, a top 13, a flue 14, a water tube 15, and a water head 16, all formed of sheet metal and preferably welded together in such a manner as to withstand pressure. Heat insulation 17 surrounds the wall 12 and top 13, thus preventing radiation losses. Service water is supplied to the service water space 10 near the water head 16 by piping 18 which may have a valve 19 therein. Hot water may be taken off from the top of the service water space 10 by piping 20. A check valve 19a is preferably installed in the piping 18 and so arranged that water may flow from the source of water supply into the heater, but is prevented from flowing in the opposite direction.

An inert water space 21 is entirely enclosed by the water tube 15, the flue 14, and a fire head 22, these being formed of sheet metal and preferably welded together in such a manner as to withstand considerable pressure. It will be noticed that the water tube 15 and the water head 16 are in contact with the fluid in both the service water space 10 and the inert water space 21, and together constitute what will be hereinafter called the indirect heat transfer wall. The flue 14 and the fire head 22 are internally heated by products of combustion and are called the direct heat wall. A partition 23 is placed in the inert water space 21, as shown, for the purpose of directing circulation by convection upwardly along the outer surface of the flue 14 and downwardly along the inner surface of the water tube 15.

Connected to the water tube 15 and extending outwardly through the outer wall 12 is an inert water space vent pipe 24 which is provided with a check valve 25 which is normally seated to close a vent 26, but which can be raised by a match, nail, or piece of bent wire 27. When the valve 25 is so seated, all outward discharge of fluid from the inert water space 21 is prevented, although air can be drawn into the inert water space 21. When the valve 25 is raised, any pressure in excess of atmospheric pressure in the inert water space is relieved by the ejection of fluid through the vent 26. A pipe 28 connected to the water tube 15 near the top thereof extends outwardly through the outer wall 12, connecting the inert water space 21 with a central cavity 30 of a controller 31.

The controller 31 consists of three separate assemblies which are grouped together for convenience. The upper portion is a water valve 32 having the function of opening communication between the service water in the piping 18 and the inert water space 21 in the event the pressure of the source of water supply falls below a predetermined minimum, which, for example, may be assumed to be ten pounds per square inch. It should be borne in mind that in all well regulated water supply systems this fall in pressure rarely occurs. Intermediate of the controller 31 is a safety valve consisting of a tapered stopper 33 which acts as a safety valve, being firmly seated as long as the service water pressure exceeds the pressure in the inert water space, but being blown out if the pressure in the inert water space exceeds the service water pressure, and then opens the inert water space to the piping 18 which is at service water pressure. In the ordinary operation of the heater this blowing out of the stopper 33 never occurs, the stopper being an emergency safety valve to take care of abnormal conditions which should never arise, but which must nevertheless be guarded against.

The third assembly, found in the bottom of the controller 31, is a gas valve 34 having the function of shutting off the flow of gas to a gas burner whenever the pressure of the inert water space exceeds a predetermined maximum, which may be assumed to be five pounds per square inch, and which should be less than the minimum pressure at which the water valve 32 opens.

The central cavity 30 of the controller 31 is formed in a body 35 also having an upper cavity 36. In a wall 37 separating the cavities 30 and 36 is an opening 38, the lower end of the opening being surrounded by a valve seat 39. The upper end of the cavity 36 is closed by a rubber or metal diaphragm 40 which is solidly clamped between the body 35 and a cap 41 by bolts 42. The cap 41 has a central cavity 43 vented to the atmosphere through a vent 44 in which is placed a compression spring 45 adapted to press the diaphragm 40 down, but which may be compressed into the position shown in Fig. 2 when a pressure of ten pounds per square inch (gauge) is exerted on the lower side of the diaphragm 40. When the diaphragm 40 is pressed up into the position shown in Fig. 2 a closure disc 46, included in the water valve 32 and which is attached to the diaphragm 40 by members 47, is pressed solidly against the seat 39. The cavity 36 is connected through a pipe 48 with the piping 18 and always contains water at the then existing water pressure. As long as this pressure exceeds the predetermined minimum established by the spring 45 and assumed to be ten pounds per square inch, the valve 32 is closed and there is no communication through the opening 38 between the inert water space 21 and the service water piping 18. Should the service water pressure fall below ten pounds per square inch, the spring 45 forces the disc 46 of the valve 32 away from the seat 39 and the pressures in the service water space 10 and the inert water space 21 equalize.

The stopper 33 closes a tapered opening 50 in the side of the central cavity 30. The opening 50 connects to a space 51 inside a screw cap 52 threaded in the side of the body 35 and this space 51 is in open communication with the upper cavity 36 through a hole 53. The stopper 33 may be an ordinary rubber or cork bottle stopper. Normally it closes the opening 50, being forced out whenever the pressure in the cavity 30 exceeds the pressure in the cavities 51 and 36; that is, the pressure of the service water. This should never occur. If it does occur, the heater should be shut down, drained, and inspected, at which time the cap 52 is unscrewed and the stopper 33 is replaced. While the stopper 33 acts as a safety valve, it does not return automatically to its seat like an ordinary safety valve, but is ejected from the opening 50 into the cap 52 and must be manually replaced. While it is out of the hole the heater can not be operated and its ejection acts as a warning that the heater is not operating properly.

The lower end of the cavity 30 is closed by a diaphragm 55 which is forced up against a perforated plate 57 by a spring 56. The plate 57 and diaphragm 55 are clamped between a base 58 and the body 35 by the bolts 42. A cavity 60 in the base 58 directly below the diaphragm 55 is in open communication with a gas pipe 61 and through an opening 62 with another cavity 63 which is in open communication with a gas pipe 64. The gas valve 34 is attached to the diaphragm 55 and includes a closure disc 65 which presses against a seat 66 surrounding the upper end of the opening 62, shutting off the flow of gas from the pipe 61 to the pipe 64 whenever the pressure on the diaphragm exceeds a predetermined minimum, assumed to be five pounds per square inch. The lower side of the diaphragm 55 is at all times exposed to the gas pressure necessary to deliver gas through the burner, but in the normal operation of the heater this pressure is so small that it need not be compensated for.

The gas pipe 61 is connected to a source of gas supply not shown through a gas valve 70. The usual pilot of the gas burner is supplied with gas through a pilot control valve 71. The pipe 64 connects to the burner 72 of the heater through a thermostat valve 73 controlled by a thermostat element 74 in the service water space 10. The thermostatic valve 73 and thermostatic element 74 may be of any convenient form, any of the well known devices now used in storage heaters being suitable. The thermostatic valve 73 is set to shut off the gas supply to the burner 72 whenever the water in the bottom of the service water space 10 reaches a predetermined maximum temperature, which may be assumed to be 150° F. The hot products of combustion from the burner 72 after giving up some of their heat to the inert water in the inert water space 21 through the fire head 22, flow upwardly through the flue 14 and transfer additional heat to the inert water in the space 21 through this flue.

The heater is put into service as follows. Both the service water space 10 and the inert water space being empty and the valves 70, 71, and 19 being closed, the valve 19 is opened slightly and water is allowed to flow through the piping 18 into the service water space and through the pipe 48 into the inert water space. During this filling period the bent wire 27 or some other convenient instrumentality is used to hold the valve 25 off its seat so that air is allowed to escape from the top of the inert water space 21. As soon as this space is filled to the level of the pipe 24, water begins to escape through the vent 26 and the wire 27 is withdrawn, thus seating the valve 25. Sufficient time is now allowed to elapse to permit the service water space 10 to fill until the water therein is at service pressure. Since this service pressure is always considerably above the pressure required to compress the spring 45, the valve 32 will close the opening 38 before the service space 10 is entirely filled, thus shutting off communication between the inert water space 21 and the service water pipe 18. During the time the valve 32 is open the pressures on either side of the stopper 33 are equal. After the valve 32 closes, the pressure on the outer end of the stopper 33 continues to build up, thus holding it in place. Before the valve 32 closes, however, a pressure of about ten pounds per square inch will have built up in the cavity 30 and this pressure acting on the diaphragm 55 causes the valve 34 to remain closed, shutting off the gas supply to the burner 72.

In order to relieve the pressure in the space 30 so that the gas valve 34 may open, the pilot valve 71 is first opened and the pilot is lighted, the valve 25 is then lifted, and the pressure in the inert water space 21 forces enough water out through the vent 26 to reduce this pressure to atmospheric. This also relieves the pressure on the diaphragm 55 and spring 56 forces the closure disc 65 of the valve 34 away from its seat and gas flows from the pipe 61 to the pipe 64. The water in the service water space 10 being cold, the thermostatic valve 73 is open and gas flows to the burner 72 where it is ignited by the pilot. The heater is now in condition to operate automatically for an indefinite period.

The hot gases of combustion transfer heat through the direct heating wall; that is, the fire head 22 and flue 14, to the inert water. The inert water flows upwardly inside the partition 23, absorbing heat, and downwardly outside the partition 23, delivering heat through the indirect heating walls; that is, the water tube 15 and water head 16, to the water in the service water space 10. Ebullition may take place in the inert water at the surface of the direct heating wall and a slight deposition of the impurities initially carried in the inert water may take place at these surfaces, but these impurities are soon exhausted and such deposition ceases. Initially such ebullition does not materially increase the pressure in the inert water space due to the rapid circulation of the water therein and the prompt condensation of the small globules of steam released from the surface of the direct heating walls. As the temperature of the inert water rises, this condensation becomes less effective and eventually steam starts to form, being released above the water level in the inert water space 21, thus increasing the pressure therein, which pressure, acting on the diaphragm 55, moves the valve disc 65 of the gas valve 34 down and gradually shuts off the flow of gas. Should the steam pressure rise to five pounds per square inch, the valve 34 entirely shuts off the flow of gas and the valve remains closed until the pressure falls.

Since the stopper 33 is subjected on its outer end to service water pressure, a steam pressure of five pounds per square inch will not force it outwardly and as long as the gas valve 34 operates properly the stopper remains in place. If for any reason the gas valve 34 fails to operate properly or if for any other reason a pressure in excess of service water pressure builds up in the inert water space 21, the stopper 33 blows outwardly, thus opening the inert water space 21 to the service water piping and equalizing these pressures. This admits full service water pressure to cavity 30 and since this pressure is in excess of five pounds per square inch the gas valve 34 can not operate normally until the stopper 33 is replaced. This necessitates draining the heater, repairing any defects therein, and putting it into service again, as previously described.

If for any reason the pressure in the service water space 10 falls below ten pounds per square inch, the valve 32 opens. Since under normal operation of the heater the gas valve closes when the pressure in the inert water space rises to not more than five pounds per square inch, thus shutting off the supply of gas to the burner and preventing further rise in pressure, it is obvious that the water valve 32 opens before the stopper 33 can be blown out.

A failure of the water supply will not cause the valve 32 to open as long as the pressure in the service water space remains at more than ten pounds per square inch since the check valve 19a closes and holds the pressure on the service water space. The check valve 19a also prevents steam generated in the inert water space 21 from blowing back into the service lines of the water company and forces this steam to flow through the piping 18 into the bottom of the service water space 10.

The thermostatic valve 73 and thermostat element 74 may be omitted if the user is willing to have the water in the service water space 10 brought up to a temperature very close to boiling since before the water in the service water space can form any steam at service water pressures the inert water will have formed enough steam at five pounds per square inch pressure to close the gas valve.

I claim as my invention:

1. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; a safety valve normally closing an opening between said spaces and adapted to open said opening whenever the pressure in said inert water space exceeds the pressure in said service water space; and means for stopping the application of heat from said heating source to said inert water through said direct heating wall whenever the pressure in said inert water space reaches a predetermined maximum below the normal pressure in said service water space.

2. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; means for temporarily allowing the pressure in said inert water space to equalize with the atmosphere; a safety valve normally closing an opening between said spaces and adapted to open said opening whenever the pressure in said inert water space exceeds the pressure in said service water space; and means for stopping the application of heat from said heating source to said inert water through said direct heating wall whenever the pressure in said inert water space reaches a predetermined maximum below the normal pressure in said service water space.

3. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; a safety valve comprising a tapered stopper carried in a tapered opening between said inert water space and said service water space, said taper being so disposed that said stopper is blown out of said opening whenever the pressure in said inert water space exceeds the pressure in said service water space; and means for stopping the application of heat from said heating source to said inert water through said direct heating wall whenever the pressure in said inert water space reaches a predetermined maximum below the normal pressure in said service water space.

4. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; means for temporarily allowing the pressure in said inert water space to equalize with the atmosphere; a safety valve comprising a tapered stopper carried in a tapered opening between said inert water space and said service water space, said taper being so disposed that said stopper is blown out of said opening whenever the pressure in said inert water space exceeds the pressure in said service water space; and means for stopping the application of heat from said heating source to said inert water through said direct heating wall whenever the pressure in said inert water space reaches a predetermined maximum below the normal pressure in said service water space.

5. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; a safety valve normally closing an opening between said spaces and adapted to open said opening whenever the pressure in said inert water space exceeds the pressure in said service water space; a gas burner, constituting said heating source, so placed that its products of combustion give up heat to said direct heating wall; a gas valve adapted to shut off the flow of gas to said gas burner; and pressure operated means adapted to close said gas valve whenever a predetermined pressure is built up in said inert water space.

6. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; means for temporarily allowing the pressure in said inert water space to equalize with the atmosphere; a safety valve normally closing an opening between said spaces and adapted to open said opening whenever the pressure in said inert water space exceeds the pressure in said service water space; a gas burner, constituting said heating source, so placed that its products of combustion give up heat to said direct heating wall; a gas valve adapted to shut off the flow of gas to said gas burner; and pressure operated means adapted to close said gas valve whenever a predetermined pressure is built up in said inert water space.

7. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; a safety valve comprising a tapered stopper carried in a tapered opening between said inert water space and said service water space, said taper being so disposed that said stopper is blown out of said opening whenever the pressure in said inert water space exceeds the pressure in said service water space; a gas burner, constituting said heating source, so placed that its products of combustion give up heat to said direct heating wall; a gas valve adapted to shut off the flow of gas to said gas burner; and pressure operated means adapted to close said gas valve whenever a predetermined pressure is built up in said inert water space.

8. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; means for temporarily allowing the pressure in said inert water space to equalize with the atmosphere; a safety valve comprising a tapered stopper carried in a tapered opening between said inert water space and said service water space, said taper being so disposed that said stopper is blown out of said opening whenever the pressure in said inert water space exceeds the pressure in said service water space; a gas burner, constituting said heating source, so placed that its products of combustion give up heat to said direct heating wall; a gas valve adapted to shut off the flow of gas to said gas burner; and pressure operated means adapted to close said gas valve whenever a predetermined pressure is built up in said inert water space.

9. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; means for stopping the application of heat from said heating source to said inert water through said direct heating wall whenever the pressure in said inert water space reaches a predetermined maximum below the normal pressure in said service water space; a relief valve normally closing an opening between said inert water space and said service water space; and pressure operated means for causing said relief valve to open said opening whenever the pressure in said service water space falls below a predetermined minimum.

10. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; means for temporarily allowing the pressure in said inert water space to equalize with the atmosphere; means for stopping the application of heat from said heating source to said inert water through said direct heating wall whenever the pressure in said inert water space reaches a predetermined maximum below the normal pressure in said service water space; a relief valve normally closing an opening between said inert water space and said service water space; and pressure operated means for causing said relief valve to open said opening whenever the pressure in said service water space falls below a predetermined minimum.

11. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; a gas burner, constituting said heating source, so placed that its products of combustion give up heat to said direct heating wall; a gas valve adapted to shut off the flow of gas to said gas burner; pressure operated means adapted to close said gas valve whenever a predetermined pressure is built up in said inert water space; a relief valve normally closing an opening between said inert water space and said service water space; and pressure operated means for causing said relief valve to open said opening whenever the pressure in said service water space falls below a predetermined minimum.

12. A water heater comprising: walls forming a service water space; walls forming an inert water space, a portion of said walls constituting an indirect heating wall through which heat is transferred from inert water in said inert water space to service water in said service water space, and a portion of said walls constituting a direct heating wall through which said inert water absorbs heat from a heating source; a gas burner, constituting said heating source, so placed that its products of combustion give up heat to said direct heating wall; a gas valve adapted to shut off the flow of gas to said gas burner; pressure operated means adapted to close said gas valve whenever a predetermined pressure is built up in said inert water space; a relief valve normally closing an opening between said inert water space and said service water space; and pressure operated means for causing said relief valve to open said opening whenever the pressure in said service water space falls below a predetermined minimum.

FORD W. HARRIS.